Nov. 12, 1963     P. K. TAYLOR     3,110,442
APPARATUS FOR MAINTAINING UNIFORM HUMIDITY
Filed May 26, 1961
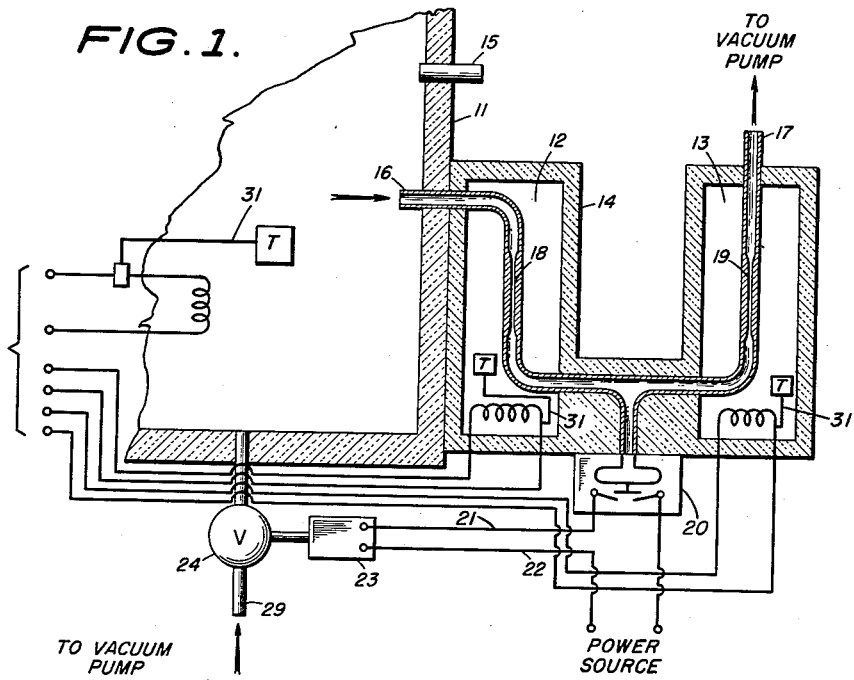
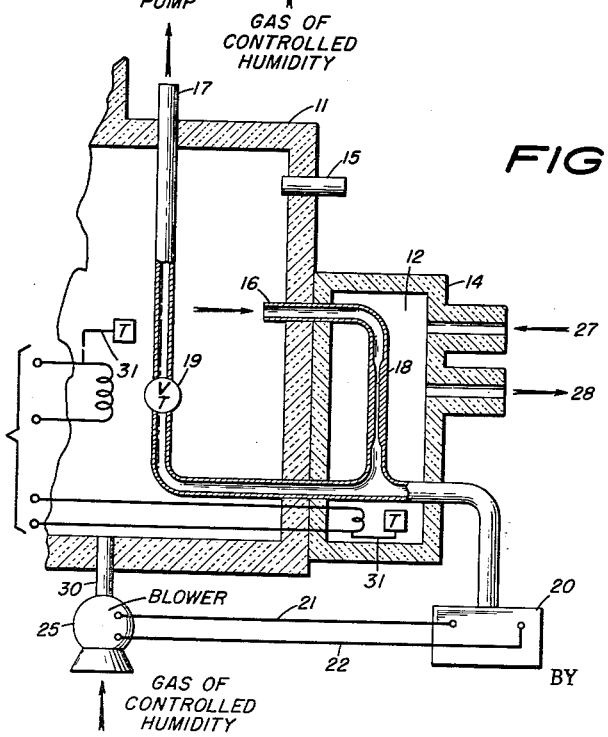
ROGER K. TAYLOR
INVENTOR

United States Patent Office 3,110,442
Patented Nov. 12, 1963

3,110,442
APPARATUS FOR MAINTAINING
UNIFORM HUMIDITY
Roger K. Taylor, Baltimore, Md., assignor to W. R. Grace & Co., a corporation of Connecticut
Filed May 26, 1961, Ser. No. 112,980
5 Claims. (Cl. 236—44)

This invention relates to apparatus for maintaining uniform humidity in closed chambers. In a more specific aspect, it relates to equipment useful for regulating humidity in such equipment as drying ovens, and the like.

The invention is dependent upon pressure variations which are caused when condensation of liquid occurs in a constricted conduit from the chamber and these pressure changes are employed to operate a control for regulating a flow of gas of controlled humidity into the chamber to restore the humidity therein to the desired level.

The apparatus includes two controlled temperature zones, one of which may be the oven itself. A conduit or tube leads from the oven through a first zone whose temperature can be controlled independently of the oven and then through a second zone, which may be the oven in which uniform humidity is to be maintained. This conduit is provided with constricted or capillary portions lying wholly within each zone and means for withdrawing through the conduit a stream of gas from the chamber.

Associated with the conduit at a point intermediate the capillary sections is a switch responsive to changes in pressure in that portion of the conduit for actuating a blower or control device to introduce relatively dry gas into the chamber in response to pressure drops in the conduit.

In the drawing, FIGURES 1 and 2 diagrammatically illustrate two embodiments of the invention, each of which incorporates the principal features of the apparatus.

In FIG. 1, the apparatus of the present invention is shown in connection with a section of a chamber 11 wherein uniform humidity is to be maintained. It is representative of such types of equipment as the conventional dryer which is usually a heated enclosure and supplied with a heating source and means for exhausting varporized water such as vent 15. Controlled temperature zones 12 and 13, each of which is insulated with a suitable material 14 are maintained at predetermined temperatures, as explained hereafter, by means of heaters or the like (not shown) placed within each zone. A conduit 16 communicates with the chamber 11 and passes first through zone 12 and thence through zone 13. Means, such as a vacuum pump (not shown), are provided at the terminus 17 of conduit 16 for withdrawing a stream of gas through said conduit 16 from the chamber 11.

Constrictions 18 and 19 are provided in conduit 16 and lie within each of zones 12 and 13. Both constrictions shown are of the capillary type, but each may be of the adjustable type, e.g., needle valve, which would permit greater flexibility in operation. Positioned intermediate the constrictions 18 and 19 of conduit 16 is a switch 20 adapted to respond to pressure changes intermediate the constrictions. Switch 20 is operatively associated via lines 21 and 22 with a motor 23 which controls valve 24 to regulate the flow of a gas of controlled humidity via conduit 29 into chamber 11. Other gas regulating means may be substituted for the motor 23 and valve 24, such as blower 25 as shown in FIG. 2. The flow of gas via valve 24 into chamber 11 is thus varied in response to pressure changes in the conduit 16 intermediate the constrictions 18 and 19.

To maintain uniform humidity in a particular chamber, such as a drying oven, the invention operates as follows:

Gas in the oven 11, which may be heated air, is withdrawn at a slow rate through conduit 16 to vacuum at 17. As long as the passage through constriction 18 remains dry, a certain constant pressure, dependent on the relation of the sizes of the constrictions 18 and 19, will be maintained in the section of the conduit 16 which lies between the constrictions. Constriction 18 is maintanied at or slightly above the desired dew point. However, if condensation occurs in the constriction 18, because of increased moisture in the chamber gas, the gas will less readily pass through the constriction. Passage is retarded because of the combined effect of water film on the walls and surface tension and viscosity of liquid water when bridging occurs. As a consequence, the pressure in the conduit 16 intermediate the constrictions 18 and 19 will drop.

Pressure-sensitive device 20 responds to the decrease in pressure and electrically energizes motor 23 to operate inlet valve 24. Gas of controlled humidity via conduit 29 is thereby admitted into chamber 11 until the humidity of the gas in the chamber 11 is restored to the desired level. When restoration of desired humidity is achieved in chamber 11, the stream of gas then passing through the conduit 16 will have a humidity representative of the gas in chamber 11 and will free the constricted passageways of condensate, thereby restoring the original pressure intermediate the constricted areas of conduit 16. The pressure increase will reflect in the operation of means 20, thus causing valve 24 to close.

The pressure changes occurring in conduit 16 intermediate the constrictions 18 and 19 cause the gas regulating means (valve 24) to become opened and closed progressively with the result that the humidity can be uniformly maintained in chamber 11 within a very narrow range.

The temperature within zone 12 should be set and maintained below that which is to prevail in chamber 11 and is controlled to yield a fixed humidity in chamber 11. When the humidity of the gas entering the conduit 16 becomes unduly high, condensation will form in the constricted passageway. Thus, the change in flow rate from chamber 11 through constriction 18 causes a change in pressure in the area between constrictions 18 and 19 of conduit 16, and consequently, this pressure change functions to operate the device 20.

Conduit 16 may be of any suitable channeling means, e.g., a glass tube or suitable piping, preferably of a non-corrodible metal since the utility of the conduit lies in the passage of a moisture-bearing gas therethrough. The flow through constriction 18 should be downward to attain optimum results. A downwardly directed passageway will tend to allow condensation to form along and bridge the constriction, whereas a flow of moisture-containing gas passing in a horizontally directed conduit would tend to have the condensate collect along the lower wall of the tube near the constriction. A condensate so deposited would still permit the passage of gas and thus prevent the apparatus from operating at full efficiency.

Once the relationship of the size of openings in the constrictions 18 and 19 and the flow of gas therethrough has been established, there is a subsequent constant control of humidity variations in chamber 11. This calibration can be attained by well known principles of physics.

In another embodiment of the invention shown in FIG. 2, the controlled temperature zone 12 may be a constant temperature bath which is thermostatically controlled by means of the device 31 at the desired temperature by the continuous passage of a suitable liquid, such as preheated water, into the zone 12 through inlet 27 and outlet 28. Zone 12 is insulated with suitable material 14 to maintain the desired temperature therein. Conduit 16 leads from and communicates with a chamber 11 and passes first through zone 12, thence reenters chamber 11 and passes upwardly therethrough. Means such as a vacuum pump (not shown) are provided at the terminus 17 of conduit 16 for withdrawing through said conduit a stream of gas from chamber 11. Constriction 18 is provided in that portion of conduit 16 lying within zone 12 and a second constriction 19 is provided in said conduit distant from constriction 18 but lying within chamber 11. Disposed between the constrictions 18 and 19 is a connection from conduit 16 to a pressure-sensitive device 20, such as a manometer or the like, which responds to pressure changes in conduit 16. Operatively associated with the device 20 via lines 21 and 22 is a blower 25 which regulates the flow of gas of controlled humidity into the chamber 11 via inlet 30.

The apparatus described and shown in FIG. 2 operates in the same manner as the embodiment illustrated in FIG. 1. Essentially, the embodiment shown in FIG. 2 dispenses with the separate controlled temperature zone 13 of FIG. 1 and in lieu thereof a portion of the conduit 16 is returned through the chamber 11 wherein the temperature is controlled.

I claim:

1. An apparatus for maintaining uniform humidity in a closed chamber being maintained at uniform temperature, said apparatus comprising means providing a first controlled temperature zone and a second controlled temperature zone, the temperature in said first zone being maintained near the dew point desired in the air in the closed chamber, a conduit adapted to communicate with said chamber and passing in turn through said first and second zones, said conduit having constrictions in those portions lying within each of said zones, means for withdrawing through said conduit a uniform slow-flowing stream of gas from said chamber, means for regulating a flow of gas of controlled humidity into said chamber, and means responsive to changes in pressure in that portion of said conduit intermediate said constrictions operatively associated with said regulating means, whereby the flow of gas into said chamber is varied in response to pressure changes in said conduit intermediate said constrictions.

2. An apparatus for maintaining uniform humidity in a closed chamber being maintained at uniform temperature, said apparatus comprising means providing a first controlled temperature zone and a second controlled temperature zone, the temperature of the first zone being held near the desired dew point of the air in said chamber, a conduit adapted to communicate with said chamber and passing in turn through said first and second zones, said conduit having a downwardly passing constricted portion lying within said first zone and a constricted portion lying within said second zone, means for continuously withdrawing through said conduit a uniform slow-flowing stream of gas from said chamber, valve means adapted to communicate with said chamber for regulating a flow of gas of controlled humidity into said chamber, a device responsive to pressure changes in said conduit intermediate the constrictions operatively associated with said valve means, whereby the flow of gas into said chamber is varied in response to the pressure changes in said conduit intermediate said constrictions.

3. An apparatus for maintaining uniform humidity in a closed chamber being maintained at uniform temperature, said apparatus comprising means providing a first controlled temperature zone maintained at a temperature near the dew point desired in said chamber, a conduit adapted to communicate with said chamber and passing in turn through said first controlled temperature zone and then adapted to pass through said chamber as a second controlled temperature zone, said conduit having a downwardly passing constricted portion lying within the first zone and adjustable means for constricting a portion of said conduit lying within said second zone, means for withdrawing through said conduit a uniform slow-flowing stream of gas from said chamber, means for regulating a flow of gas of controlled humidity into said chamber, means responsive to pressure changes in said conduit intermediate the constrictions to control said regulating means, whereby the flow of gas into said chamber is varied in response to the pressure changes in said conduit intermediate said constrictions.

4. An apparatus for maintaining uniform humidity in a closed chamber being maintained at uniform temperature, said apparatus comprising means providing a first controlled temperature zone maintained near the dew point desired in the air in the closed chamber, means defining a second controlled temperature zone adapted to be internally disposed in said chamber, including a conduit adapted to communicate with said chamber and passing in turn through first and second zones, said conduit having a downwardly passing constricted portion lying within said first zone and a second constricted portion lying within said second zone, means for withdrawing through said conduit a uniform slow flow of gas from said chamber, a valve for regulating a flow of gas of controlled humidity into said chamber, and means responsive to pressure changes in said conduit intermediate the constrictions operatively associated with said valve for controlling the flow of gas into said chamber which is varied in response to the changes in pressure in said conduit intermediate said constrictions.

5. An apparatus maintaining uniform humidity in a chamber being maintained at uniform temperature, said apparatus comprising means providing a chamber maintained at uniform temperature and means providing a thermostatically controlled zone wherein the temperature is maintained at about the dew point, a conduit communicating with said chamber and passing first through said zone and thence re-entering said chamber and passing upwardly therethrough, said conduit having a downwardly passing first constricted portion lying within said zone and a second constricted portion lying within said chamber, means for withdrawing through said conduit a uniform slow flow of gas from said chamber, means for regulating a flow of gas of controlled humidity into said chamber and means responsive to pressure changes in said conduit intermediate the constrictions operatively associated with said gas regulating means whereby the flow of gas into said chamber is varied in response to the pressure changes in said conduit intermediate said constrictions.

References Cited in the file of this patent

UNITED STATES PATENTS

| | | |
|---|---|---|
| 1,630,318 | Tate | May 31, 1927 |
| 1,880,720 | Blackwood | Oct. 4, 1932 |
| 2,143,795 | Okey | Jan. 10, 1939 |
| 2,255,734 | McGrath | Sept. 9, 1941 |
| 2,268,442 | Crawford | Dec. 30, 1941 |
| 2,316,624 | Romanelli | Apr. 13, 1943 |